United States Patent [19]

Kawakatsu et al.

[11] Patent Number: 4,904,720

[45] Date of Patent: Feb. 27, 1990

[54] PROCESS FOR IMPROVING PROPERTIES OF SYNTHETIC RESIN POWDER

[75] Inventors: Atsushi Kawakatsu, Takasago; Ryuichi Takagi, Akashi; Takeshi Nagano, Yokohama, all of Japan

[73] Assignee: Kanegafuchi Kagaku Koyo Kabushiki Kaisha, Osaka, Japan

[21] Appl. No.: 198,346

[22] Filed: May 25, 1988

[30] Foreign Application Priority Data

May 29, 1987 [JP] Japan ................................ 62-137098

[51] Int. Cl.$^4$ .......................... C08J 3/20; C08K 5/00; C08L 51/04
[52] U.S. Cl. .................................... 524/263; 524/264; 524/265; 524/266; 524/267; 524/268; 524/504
[58] Field of Search ................................ 524/263–269, 524/504

[56] References Cited

U.S. PATENT DOCUMENTS 4,656,212  4/1987  Hosoda et al. ...................... 524/269

FOREIGN PATENT DOCUMENTS 57-59929  4/1982  Japan .
59929     4/1982  Japan .

Primary Examiner—Herbert J. Lilling
Attorney, Agent, or Firm—Armstrong, Nikaido, Marmelstein, Kubovcik & Murray

[57] ABSTRACT

A process for improving properties of a synthetic resin powder which comprises: subjecting a latex of a graft-copolymer whose back bone is a rubber to coagulation, and adding a silicone oil to the graft-copolymer in an amount of 0.01 to 10 parts by weight based on 100 parts by weight of said graft-copolymer. According to the present invention, the bulk specific gravity of a synthetic resin powder can be made large, the flowability and blocking resistance can be remarkably improved in comparison with known methods. Accordingly, the blocking during storage can be prevented, a line for transport is not packed with the resin powder, it is possible to automatically weigh the resin powder, and it is applicable to the tendency to grow larger in transport.

5 Claims, No Drawings

PROCESS FOR IMPROVING PROPERTIES OF SYNTHETIC RESIN POWDER

BACKGROUND OF THE INVENTION

The present invention relates to a process for improving properties of a synthetic resin powder, and more particularly to a process for improving properties of a synthetic resin powder which comprises subjecting a latex of a graft-copolymer whose back bone is a rubber to coagulation and adding a silicone oil to the obtained graft-copolymer, thereby obtaining a synthetic resin powder having excellent properties.

Various studies have hitherto been made for improving properties to be required as a powder such as fluidity and blocking resistance of a synthetic resin powder. There are, for instance, a method in which a latex of a copolymer is solidified in a gaseous phase as described in Japanese Unexamined Patent Publication No. 59929/1982, a method in which a latex of a copolymer is spray-dried, a method in which a latex of a copolymer is dispersed in a specific solvent in the state of a sphere and coagulation of the copolymer is carried out, and the like.

However, the known methods have insufficient effects for the improvement of properties of a synthetic resin powder. So, there has not yet been obtained a synthetic resin powder having fluidity and blocking resistance applicable to an automatic weighing of the resin powder and a tendency to grow larger in transport of the resin powder. The present inventors have considered that improvement of the properties of a synthetic resin powder is indispensable for applying to the automatic weighing and the tendency to grow larger in transport.

An object of the present invention is to provide a process for improving properties of a synthetic resin powder, thereby obtaining a resin powder sufficiently applicable to the above-mentioned requirements.

This and other objects of the present invention will become apparant from the following description.

SUMMARY OF THE INVENTION

In accordance with the present invention, there is provided a process for improving properties of a synthetic resin powder which comprises subjecting a latex of a graft-copolymer whose back bone is a rubber to coagulation, and adding a silicone oil to the obtained graft-copolymer in an amount of 0.01 to 10 parts by weight based on 100 parts by weight of the graft-copolymer.

DETAILED DESCRIPTION

In the present invention, a latex of a graftcopolymer can be obtained by firstly preparing a rubber, which is a back bone of the graft-copolymer, in a usual emulsion polymerization, and then graft-copolymerizing a monomer copolymerizable with the rubber with the rubber in a usual emulsion polymerization.

The monomers used for preparing the rubber, the back bone of the graft-copolymer, are diene monomers such as butadiene, isoprene and chloroprene, and/or alkyl acrylates. The number of carbon atoms of the alkyl acrylate is generally from 4 to 11, preferably from 5 to 7.

Also, the monomers may be copolymerized with a monomer copolymerizable with the diene monomers or the alkyl acrylates. Examples of the copolymerizable monomers are, for instance, an alkyl methacrylate such as methyl methacrylate or ethyl methacrylate; a vinyl cyanide such as acrylonitrile or methacrylonitrile; an aromatic vinyl compound such as styrene or α-methyl styrene; a halogenated vinyl compound such as vinyl chloride or vinyl bromide; and the like. The copolymerizable monomers are not limited thereto.

When preparing the rubber, a cross-linking agent may be used or not. Examples of the cross-linking agents are, for instance, divinyl benzene, monoethylene glycol dimethacrylate, polyethylene glycol dimethacrylate, and the like. The cross-linking agent are not limited thereto.

A preferable rubber can be obtained by polymerizing 20 to 80 parts by weight of butadiene, 0 to 50 parts by weight of styrene, 0 to 20 parts by weight of a copolymerizable monomer with styrene or butadiene, and 0 to 5 parts by weight of the cross-linking agent, the total amount thereof being 100 parts by weight, in an emulsion polymerization.

Then, monomers copolymerizable with the rubber are graft-copolymerized with the rubber to give the graft-copolymer whose back bone is rubber. Examples of the copolymerizable monomers are, for instance, an alkyl acrylate such as methyl acrylate, ethyl acrylate, butyl acrylate or octyl acrylate; and alkyl methacrylate such as methyl methacrylate or ethyl methacrylate; a vinyl cyanide such as acrylonitrile or methacrylonitrile; an aromatic vinyl compound such as styrene or α-methyl styrene; a halogenated vinyl compound such as vinyl chloride or vinyl bromide; and the like. The graft-copolymerizable monomers are not limited thereto. Is is preferable that the amount of the graft-copolymerizable monomer is from 25 to 1,900 parts by weight, more preferably from 40 to 150 parts by weight, based on 100 parts by weight of the rubber. The graft-copolymerizable monomers are added to the rubber in the absence or presence of a cross-linking agent to graft-copolymerize. Examples of the cross-linking agent are, for instance, divinyl benzene, monoethylene glycol dimethacrylate, polyethylene glycol dimethacrylate, and the like. It is preferable that the amount of the cross-linking agent is from 0 to 50 parts by weight based on 100 parts by weight of the rubber.

It is preferable that the graft-copolymerized part in the graft-copolymer is prepared from 30 to 70% by weight of methyl methacrylate, 30 to 70% by weight of styrene, 0 to 20% by weight of the other copolymerizable monomer therewith and 0 to 5% by weight of the cross-linking agent.

Thus obtained graft-copolymer is composed of 5 to 80% by weight, preferably from 20 to 60% by weight, of the rubber and 20 to 95% by weight, preferably from 40 to 80% by weight, of the graft-copolymerized part. When the amount of the rubber is less than 5% by weight, the powder properties of fluidity and blocking resistance are so good that it is not necessary to improve them. On the other hand, when the amount is more than 80% by weight, it is impossible to produce a resin powder.

In the present invention, examples of the coagulant used in the coagulation of the graft-copolymer from the latex are, for instance, an inorganic acid such as sulfuric acid, hydrochloric acid, phosphoric acid or nitric acid, and a salt thereof with an alkali metal such as sodium or potassium; an organic acid such as acetic acid, and a salt thereof with an alkali metal; a halogenated alkali metal;

and the like. These coagulants may be used alone or as an admixture thereof.

The amount of the coagulant is from 0.05 to 10 parts by weight, preferably from 0.1 to 5 parts by weight, based on 100 parts by weight of the latex of the graft-copolymer. When the amount of the coagulant is less than 0.05 part by weight, the coagulation is carried out insufficiently, and on the other hand, when the amount is more than 10 parts by weight, the properties of the obtained synthetic resin are lowered.

The latex is subjected to coagulation and then the silicone oil is added to the coagulated graft-copolymer. The amount of the silicone oil is from 0.01 to 10 parts by weight, preferably from 0.1 to 3 parts by weight, based on 100 parts by weight of the graft-copolymer. When the amount of the silicone oil is less than 0.01 part by weight, the properties of the synthetic resin powder are insufficiently improved. On the other hand, when the amount is more than 10 parts by weight, the properties of the synthetic resin itself are lowered.

The silicone oil used in the present invention is a polyorganosiloxane having the formula (I):

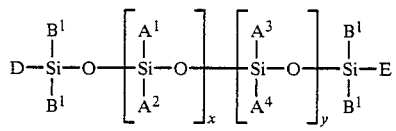
(I)

wherein $A^1$, $A^2$, $A^3$ and $A^4$ are the same or different and each is a group selected from the group consisting of a hydrogen atom, an alkyl group having 1 to 20 carbon atoms, $-R^1OH$ in which $R^1$ is an alkylene group having 1 to 20 carbon atoms, $-R^1CH_3$ in which $R^1$ is as defined above, $-R^1OCH_3$ in which $R^1$ is as defined above, $-R^1COOH$ in which $R^1$ is as defined above,

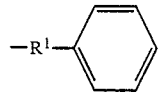

in which $R^1$ is as defined above,

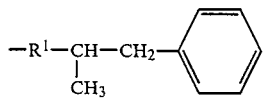

in which $R^1$ is as defined above, $-R^1\text{-SH}$ in which $R^1$ is as defined above, $-R^1NH_2$ in which $R^1$ is as defined above, $-R^1-NHC_2H_4NH_2$ in which $R^1$ is as defined above,

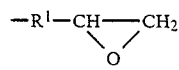

in which $R^1$ is as defined above, $-R^1-O-R^2$ in which $R^2$ is an alkyl group having 1 to 20 carbon atoms and $R^1$ is as defined above and $-R^1-X$ in which X is a halogen atom and $R^1$ is as defined above; $B^1$, D and E are the same or different and each is a group selected from the group consisting of an alkyl group having 1 to 20 carbon atoms, $-R^1OH$ in which $R^1$ is as defined above and $-R^1OCH_3$ in which $R^1$ is as defined above; x is an integer of 1 to 5,000 and y is an integer of 1 to 5,000.

Examples of the preferable silicone oil are, for instance a dimethyl silicone oil such as a compound having the formula:

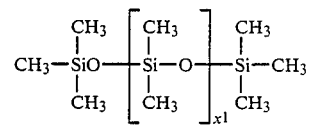

wherein $x^1$ is an integer of 100 to 1,000; a silicone oil modified with fluorine such as a compound having the formula:

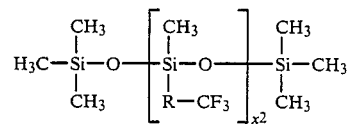

wherein R is an alkylene group having 1 to 5 carbon atoms and $x^2$ is an integer of 100 to 1,000; a silicone oil modified with α-methyl styrene such as a compound having the formula:

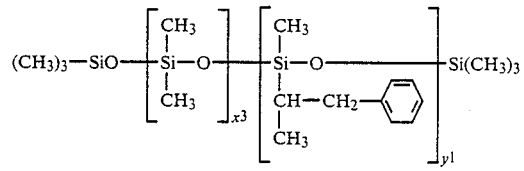

wherein $x^3$ is an integer of 30 to 250 and $y^1$ is an integer of 20 to 140, and the like.

The coagulated graft-copolymer is subjected to heat-treatment with steam or an electric heater at 50° to 100° C. for 0.1 to 1 hour, then is dehydrated by using a dehydrator such as vacuum dehydrator, a centrifugal dehydrator or a press dehydrator, and finally is dried by using a dryer such as a shelf dryer or a vacuum dryer at 50° to 90° C. for 5 to 30 minutes. The silicone oil (I) can be added to the graft-copolymer at any time. For instance, the silicone oil (I) can be added to the coagulated graft-copolymer, the graft-copolymer subjected to the heat-treatment, the graft-copolymer dehydrated, the graft-copolymer dried, and the like. In the present invention, it is the most preferable to add the silicone oil (I) to the graft-copolymer in the state of powder after dehydrating or drying, because the excellent effect for improving the properties of the synthetic resin powder can be obtained.

The present invention is more specifically described and explained by means of the following Examples and Comparative Examples in which all % and parts are by weight unless otherwise noted. It is to be understood that the present invention is not limited to the Examples and Comparative Examples, and various changes and modifications may be made in the invention without departing from the spirit and scope thereof.

EXAMPLE 1

A 5 l polymerization vessel equipped with a stirrer was charged with 200 parts of water, 1.5 parts of sodium oleate, 0.002 part of ferrous sulfate, 0.005 part of disodium ethylenediaminetetraacetate, 0.2 part of potassium phosphate, 0.2 part of formaldehyde sodium sulfoxylate, 75 parts of butadiene, 25 parts of styrene, 1.0 part of divinylbenzene, and 1.0 part of diisopropylbenzene hydroperoxide, and the polymerization was conducted at 50° C. for 5 hours to give a rubber in a polymerization conversion of 98%. Then, a 5 l polymerization vessel equipped with a stirrer was charged with 180 parts (solid matter: 60 parts) of the obtained rubber, 90 parts of water, 0.002 part of ferrous sulfate, 0.004 part of disodium ethylenediaminetetraacetate, 0.1 part of formaldehyde sodium sulfoxylate, 20 parts of styrene and 20 parts of methyl methacrylate, and the polymerization was conducted at 60° C. for 8 hours to give a latex of a graft-copolymer in a conversion of 99%.

There was added 300 ml of a 10% hydrochloric acid solution to 3 l of the obtained graft-copolymer latex (graft-copolymer: 40 parts) to coagulate the graft-copolymer, and a dimethyl silicone oil having the formula:

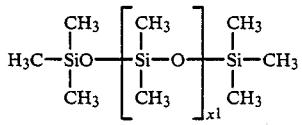

wherein $x^1$ is an integer of 100 to 250, which is commercially available under the trade name "200 Fluid 350 cSt" made by Dow Corning Corp. was added thereto. The mixture was subjected to heat-treatment, then dehydration and finally drying.

With respect to the obtained resin powder, the bulk specific gravity, fluidity index, disintegration and shearing load were measured according to the following methods. The results are shown in Table 1.

Bulk specific gravity

The bulk specific gravity (g/ml) of the obtained resin powder is measured according to Japanese Industrial Standards (JIS) K 6721.

Fluidity index

With respect to the obtained resin powder, the fluidity index is found according to a method as described in Chemical Engineering, pages 163–168, published on Jan. 18, 1965.

That is, an angle of repose, a compressibility, a spatula angle and a uniformity (a cohesion) of the obtained resin powder are measured and four indexes are found from the results obtained as above according to a conversion table. The fluidity index is the sum of the four indexes. The larger the fluidity index, the better the fluidity.

Disintegration

The obtained resin powder is hardened into a mass with a load of 5 kg/cm² to give a cylindrical block having a diameter of 5 cm and a height of 3 cm. The block is vibrated at a frequency of 60 Hz for 100 seconds to break the block. The disintegration is as follows:

Disintegration (%) =

$$\frac{\text{A weight of the resin particles having a particle size of 18 mesh pass}}{\text{A weight of the original block}} \times 100$$

The larger the disintegration, the better the blocking resistance.

Shearing load

A PTO powder bed tester made by Sankyo Dengyo Kabushiki Kaisha is charged with the obtained resin powder and a direct shear test is carried out with a load of 20 kg/cm². The maximum load (kg) is shown in Table 1. The smaller the value, the better the blocking resistance.

EXAMPLE 2

The procedure of Example 1 was repeated except that 0.1 part of a silicone oil modified with fluorine having the formula:

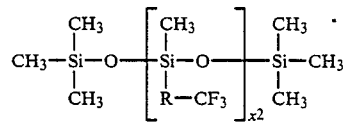

wherein R is an alkylene group having 1 to 5 carbon atoms and $x^2$ is an integer of 100 to 300, which was commercially available under the trade name "FQF 510" made by Toshiba Silicon Kabushiki Kaisha was used instead of the dimethyl silicone oil to give a synthetic resin powder.

The bulk specific gravity, fluidity index, disintegration and shearing load were measured in the same manner as in Example 1. The results are shown in Table 1.

EXAMPLE 3

The procedure of Example 1 was repeated except that a silicone oil modified with α-methyl styrene having the formula:

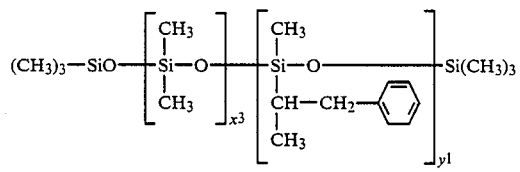

wherein $x^3$ is an integer of 150 to 250 and $y^1$ is an integer of 120 to 140, which is commercially available under the trade name "KF 410" made by Shinetsu Silicon Kabushiki Kaisha was used instead of the dimethyl silicone oil to give a synthetic resin powder.

The bulk specific gravity, fluidity index, disintegration and shearing load were measured in the same manner as in Example 1. The results are shown in Table 1.

COMPARATIVE EXAMPLE 1

The procedure of Example 1 was repeated except that a silicone oil was not added to give a synthetic resin powder.

The bulk specific gravity, fluidity index, disintegration and shearing load were measured in the same manner as in Example 1. The results are shown in Table 1.

TABLE 1

| Ex. No. | Bulk specific gravity (g/ml) | Fluidity index | Dis- integration (%) | Shearing load (kg) |
| --- | --- | --- | --- | --- |
| Ex. 1 | 0.427 | 85 | 100 | 65 |
| Ex. 2 | 0.420 | 82 | 98 | 72 |
| Ex. 3 | 0.422 | 78 | 95 | 70 |
| Com. Ex. 1 | 0.382 | 65 | 21 | 162 |

According to the present invention, the bulk specific gravity of the synthetic resin powder can be made large, and the fluidity and the blocking resistance can be remarkably improved in comparison with known methods without impairing the original properties of the resin. Therefore, not only the blocking during storage can be prevented or a line for transport is not packed with the powder, but also it is possible to automatically weigh the powder or it is applicable to the tendency to grow larger in transport.

In addition to the ingredients used in the Examples, other ingredients can be used as set forth in the specification to obtain substantially the same results.

What we claim is:

1. A process for preparing a powdery synthetic resin which comprises:

subjecting a latex of a graft-copolymer whose backbone is a rubber to coagulation, heat treating the coagulated graft-copolymer adding a silicone oil to the coagulated graft-copolymer in an amount of 0.01 to 10 parts by weight based on 100 parts by weight of said graft-copolymer before or after heat treatment, and removing water from the resulting mixture thereby forming the mixture into a dried powder.

2. The process of claim 1, wherein said silicone oil is a polyorganosiloxane having the formula (I)

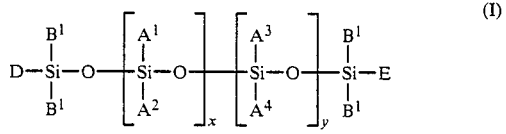

(I)

wherein $A^1$, $A^2$, $A^3$ and $A^4$ are the same or different and each is a group selected from the group consisting of a hydrogen atom, an alkyl group having 1 to 20 carbon atoms, $-R^1OH$ in which $R^1$ is an alkylene group having 1 to 20 carbon atoms, $-R^1CF_3$ in which $R^1$ is as defined above, $-R^1OCH_3$ in which $R^1$ is as defined above, $-R^1COOH$ in which $R^1$ is as defined above,

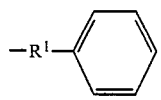

in which $R^1$ is as defined above,

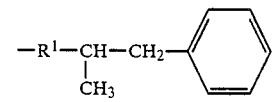

in which $R^1$ is as defined above, $-R^1$-SH in which $R^1$ is as defined above, $-R^1NH_2$ in which $R^1$ is as defined above, $-R^1-NHC_2H_4NH_2$ in which $R^1$ is as defined above,

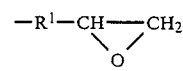

in which $R^1$ is as defined above, $-R^1-O-R^2$ in which $R^2$ is an alkyl group having 1 to 20 carbon atoms and $R^1$ is as defined above and $-R^1$-Z in which Z is a halogen atom and $R^1$ is as defined above; $B^1$, D and E are the same or different and each is a member selected from the group consisting of an alkyl group having 1 to 20 carbon atoms, $-R^1OH$ in which $R^1$ is as defined above, $-R^1OCH_3$ in which $R^1$ is as defined above; x is an integer of 1 to 5,000 and y is an integer of 1 to 5,000.

3. The process of claim 1, comprising adding silicone oil to the coagulated latex, and heat treating, dehydrating and drying the resultant mixture.

4. The process of claim 1, comprising heat treating the coagulated latex and adding silicone oil to the heat treated latex and dehydrating and drying the resulting mixture.

5. The process of claim 1, comprising heat treating and dehydrating the coagulated latex and adding silicone oil to the dehydrated latex and drying the resulting mixture.

* * * * *

UNITED STATES PATENT AND TRADEMARK OFFICE
CERTIFICATE OF CORRECTION

PATENT NO. : 4,904,720
DATED : February 27, 1990
INVENTOR(S) : KAWAKATSU et al

It is certified that error appears in the above-identified patent and that said Letters Patent is hereby corrected as shown below:

On the cover page, Item [73], "Kanegafuchi Kagaku Koyo Kabushiki Kaisha" should read --Kanegafuchi Kagaku Kogyo Kabushiki Kaisha--.

Signed and Sealed this

Second Day of July, 1991

Attest:

HARRY F. MANBECK, JR.

*Attesting Officer*   *Commissioner of Patents and Trademarks*